United States Patent [19]

Onaka et al.

[11] Patent Number: 5,204,024
[45] Date of Patent: Apr. 20, 1993

[54] METHOD FOR PREVENTING AGGLOMERATION OF POWDER

[75] Inventors: Tadao Onaka, Shinnanyo; Hiroshi Fukuda, Tokuyama, both of Japan

[73] Assignee: Tosoh Corporation, Shinnanyo, Japan

[21] Appl. No.: 888,379

[22] Filed: May 22, 1992

Related U.S. Application Data

[63] Continuation of Ser. No. 729,689, Jul. 15, 1991, abandoned.

[30] Foreign Application Priority Data

Jul. 16, 1990 [JP] Japan .................................. 2-185255

[51] Int. Cl.$^5$ .......................................... C09D 139/06
[52] U.S. Cl. ...................................... 252/384; 427/220
[58] Field of Search ................ 252/384; 427/221, 220; 423/545

[56] References Cited

U.S. PATENT DOCUMENTS

| | | | |
|---|---|---|---|
| 2,539,012 | 1/1951 | Diamond et al. | 252/384 X |
| 2,689,166 | 9/1954 | Rust et al. | 252/384 X |
| 2,797,982 | 7/1957 | McKinney | 252/384 X |
| 2,990,246 | 6/1961 | Scott et al. | 252/384 X |
| 3,388,990 | 6/1968 | Maruta et al. | 252/384 X |
| 3,556,718 | 1/1971 | Bachmann | 252/384 X |
| 3,627,713 | 12/1971 | Maruta et al. | 252/384 X |
| 3,922,332 | 11/1975 | Schenk | 252/384 X |
| 3,980,593 | 9/1976 | Knorre et al. | 252/384 X |
| 4,042,529 | 8/1977 | Nimerick et al. | 252/384 |
| 4,192,756 | 3/1980 | Mondshine | 252/384 |
| 4,559,384 | 12/1985 | Nomura et al. | 252/384 |
| 4,628,092 | 12/1986 | Takahashi et al. | 252/384 |
| 4,742,168 | 5/1988 | May | 252/384 |
| 4,818,292 | 4/1989 | Iley et al. | 252/384 |
| 4,859,774 | 8/1989 | Takahashi et al. | 252/384 |
| 4,990,616 | 2/1991 | Panunto | 252/384 |

FOREIGN PATENT DOCUMENTS

| | | |
|---|---|---|
| 2074840 | 10/1971 | France . |
| 1109665 | 4/1968 | United Kingdom . |
| 1128192 | 9/1968 | United Kingdom . |

*Primary Examiner*—Robert L. Stoll
*Assistant Examiner*—Valerie Fee
*Attorney, Agent, or Firm*—Oblon, Spivak, McClelland, Maier & Neustadt

[57] ABSTRACT

A method for preventing agglomeration of powder, characterized in that a polyvinyl pyrrolidone and/or a vinyl pyrrolidone-vinyl ester copolymer is incorporated as an anti-agglomeration agent to the powder.

7 Claims, No Drawings

METHOD FOR PREVENTING AGGLOMERATION OF POWDER

This application is a continuation of application Ser. No. 07/729,689, filed on Jul. 15, 1991, now abandoned.

The present invention relates to a method for preventing agglomeration of powder which is likely to agglomerate. More particularly, it relates to a method for preventing agglomeration of powder by using a polyvinyl pyrrolidone or a vinyl pyrrolidone-vinyl ester copolymer as an anti-agglomeration agent.

A powder of an amine such as piperazine or triethylenediamine (hereinafter referred to simply as TEDA) is a compound which usually has coherence and adherence and thus is likely to agglomerate. Not to mention such a specific powder, a highly hygroscopic powder or a highly sublimable powder in general usually readily undergoes agglomeration due to an inclusion of a small amount of moisture or due to an increase of the temperature. Therefore, such, an agglomerative powder is required to be handled with due care, and once such a powder has agglomerated, the handling tends to be extremely difficult. As measures to prevent agglomeration of such an agglomerative powder, it is common to employ a method of removing impurities contained in the powder and enlarging the particle size of the powder itself, a method of adding an anti-agglomeration agent to the powder or a method of storing the powder by means of a closed vessel. However, among agglomerative powders, there is one which undergoes agglomeration even when stored in a closed vessel, such as piperazine, or a highly sublimable substance such as TEDA which tends more likely to agglomerate when the purity is increased. Therefore, there has been no appropriate method for preventing agglomeration of such a powder. Further, such a powder has very strong agglomerating nature, and it is usually difficult to prevent the agglomeration by enlarging the particle size. As a method for preventing agglomeration of such a highly agglomerative powder, it is usually believed to be effective to incorporate a suitable anti-agglomeration agent.

For the selection of such an anti-agglomeration agent, it is desired to select an agent which is capable of effectively accomplishing the object in an amount as small as possible and which does not impart an odor or a color to the powder by the addition. Further, it is desired to select an anti-agglomeration agent which presents no adverse effects to the physical properties of the powder in connection with the purpose of the powder and which is inexpensive. As conventional anti-agglomeration agents, silica powder (Japanese Unexamined Patent Publication No. 203039/1982) and polyethylene glycols (Japanese Examined Patent Publication No. 46758/1988) are known. However, the silica powder is effective only to temporarily avoid the contact of crystals to one another and its anti-agglomerating action is not so strong for a long term. On the other hand, liquid anti-agglomeration agents such as polyethylene glycols may simply be mixed with TEDA powder. As a consequence, however, the TEDA powder tends to be wet, and in a long range storage, the liquid tends to flow to the bottom of the container and tends to be non-uniform in the container, whereby the anti-agglomerating action tends to be low. Further, in either case, the anti-agglomeration agent is required to be added at a relatively high concentration, whereby the purity of TEDA will be low.

Whereas, Japanese Examined Patent Publications No. 2241/1988 and No. 3142/1989 disclose that by an addition of a TEDA polymer as an,additive during a precipitation step, it is possible to simplify the process of the addition so that the process control can be easy, and the TEDA polymer exhibits a high level of anti-agglomerating action, whereby adequate effects can be obtained by an addition of a very small amount of the polymer. However, this TEDA polymer is insoluble in most organic solvents.

Powders usually have coherence and adherence in many cases. It is common to employ an operation such as granulation or classification to reduce such nature. However, in a case of a agglomerative powder such as a highly sublimable powder of e.g. TEDA, sublimation and condensation are repeated due to a change of e.g. the external temperature, whereby a strong bridge will be formed between powder particles (crystals). Thus, TEDA tends to agglomerate entirely in the container and tends to be hardly disintegrated.

TEDA is usually synthesized or produced from e.g. N-aminoethylpiperazine or hydroxyethylpiperazine. By such a method, TEDA is obtainable as slightly yellow white crystals. As a by-product, an alkylpiperazine or the like is contained. This by-product has an anti-agglomerating action to some extent. However, TEDA crystals of high purity have been desired in recent years, and consequently, TEDA crystals having a purity of at least 99.9% are now produced as a result of an improvement in the purification technique. Accordingly, the agglomerating nature of TEDA has been thereby sharply increased, and there has been a problem from the viewpoint of the production process or the storage.

It is an object of the present invention to provide a method for preventing agglomeration of powder having agglomerating nature, whereby prevention of agglomeration can effectively be conducted by adding a small amount of an anti-agglomeration agent which is excellent in the solubility to various solvents and which is inexpensive and has no adverse effect to the physical properties of the powder, as compared with the conventional methods.

As a result of an extensive study in view of the above-mentioned circumstances, the present inventors have found it possible to effectively control agglomeration of powder by using a polyvinyl pyrrolidone and/or a vinyl pyrrolidone-vinyl ester copolymer as an anti-agglomeration agent, and have arrived at the present invention on the basis of this discovery.

Thus, the present invention provides a method for preventing agglomeration of agglomerative powder, which comprises incorporating to the powder a polyvinyl pyrrolidone and/or a vinyl pyrrolidone-vinyl ester copolymer alone or in combination with other anti-agglomeration agent (such as polyethylene glycol, hydroxypropyl cellulose, TEDA polymer or silica gel), to control the agglomerating nature.

Now, the present invention will be described in detail with reference to the preferred embodiments.

In the present invention, the agglomerative powder means a highly hygroscopic and/or sublimable powder of e.g. piperazine, TEDA, ammonium sulfate, ammonium chloride or sodium chloride.

Two types of causes are conceivable as the main causes for agglomeration of powder i.e. agglomeration due to absorption of moisture and agglomeration due to bridging of powder particles (crystals) by sublimation and condensation. The former can be avoided by packaging. Otherwise it can be avoided by improving the quality control of the product. With respect to the latter, there has been no effective method discovered which presents no adverse effects to the physical properties of the powder and which fully satisfies other conditions. The present invention presents a very effective agglomeration-preventing method by incorporating an anti-agglomeration agent which prevents absorption of moisture and the sublimation and condensation action.

The mechanism for preventing agglomeration in the present invention is considered to be as follows. Polyvinyl pyrrolidones and/or vinyl pyrroliodone-vinyl ester copolymers exhibit excellent solubility to various solvents, and they are capable of forming transparent strong films from their solutions in water or in organic solvents. A solution of such a polyvinyl pyrrolidone or a vinyl pyrrolidone-vinyl ester copolymer in water or in an organic solvent is mixed to the powder, followed by drying to form a film on the surface of the powder and thereby to microcapsulate the crystals, so that the contact of the crystal-forming component with outer atmosphere or the contact of crystals to one another is prevented, whereby the absorption of moisture and the sublimation and condensation, are suppressed. Thus, agglomeration of crystals to one another is suppressed, and agglomeration-preventing effects can be obtained.

The polyvinyl pyrrolidone in the present invention may, for example, be a compound of the following formula (1):

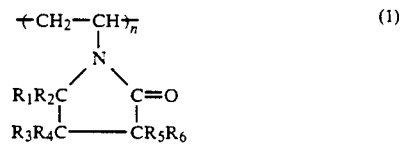

(1)

wherein n is an integer of at least 1, and each of $R_1$ to $R_6$ is H or a $C_{1-4}$ alkyl group.

The vinyl pyrrolidone-vinyl ester copolymer in the present invention may, for example, be a compound of the following formula (2):

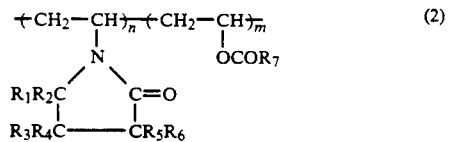

(2)

wherein each of n and m is an inte9er of at least 1, $R_1$ to $R_6$ are as defined above, and $R_7$ is a $C_{1-2}$ alkyl group.

For example, a polyvinyl pyrrolidone of the formula (1) and a vinyl pyrrolidone-vinyl ester copolymer of the formula (2), wherein each of $R_1$ to $R_6$ is H and $R_7$ is a methyl group, are commercially available under tradenames Koridone and Rubiscol, respectively, from BASF Japan and Mitsubishi Trading Company.

Such polyvinyl pyrrolidones or vinyl pyrrolidonevinyl ester copolymers are available with a wide range of molecular weights ranging from a low molecular weight of a few thousands to an average molecular weight exceeding 1,000,000, and the viscosities of their solutions are proportional to the average molecular weights. The average molecular weight of the polyvinyl pyrrolidone or the vinyl pyrrolidone-vinyl ester copolymer to be used may be at any level. However, if the molecular weight is too high, the viscosity of the solution tends to be high, whereby the dissolving method and handling tend to be difficult. Preferred is a polyvinyl pyrrolidone or a vinyl pyrrolidone-vinyl ester copolymer having an average molecular weight of from 10,000 to 100,000.

Further, the polymerization ratio of the vinyl pyrrolidone to the vinyl acetate in the vinyl pyrrolidone-vinyl ester copolymer may be at any level. However, the higher the ratio of the vinyl acetate, the lower the absorption of moisture tends. The polymerization ratio of the vinyl pyrrolidone to the vinyl acetate is preferably from 5/5 to 3/7.

According to the present invention, there is no particular restriction as to the method for adding the polyvinyl pyrrolidone and/or the vinyl pyrrolidone-vinyl ester copolymer to the powder. For example, it is common to employ a method wherein after the preparation of powder, the powder and a solution of the polyvinyl pyrrolidone or the vinyl pyrrolidone-vinyl ester copolymer in water or in an organic solvent are thoroughly mixed by means of, a mixing apparatus such as a ribbon blender or a V-type mixer. However, to employ such a mixing apparatus, the process tends to be complex, and the cost is expected to be substantial. Whereas, if a solution of the polyvinyl pyrrolidone or the vinyl pyrrolidone-vinyl ester copolymer in water, or in an organic solvent is sprayed or otherwise added during the liquid removal step immediately after precipitation i.e. a TEDA crystal cake in a centrifugal separator, followed by drying, it is possible to effectively and uniformly accomplish the coating on the TEDA crystal surface without requiring any mixing apparatus. Otherwise, it may be added during the precipitation step, as disclosed in Japanese Examined Patent Publication No. 62241/1988.

Anti-agglomeration agents presently used are silica powders and polyethylene glycols. The anti-agglomerating ability of such conventional additives is relatively low, and when the agglomerative powder is TEDA, such conventional additives are required in an amount of about 1 part by weight per 100 parts by weight of TEDA. Whereas, according to the present invention, the polyvinyl pyrrolidone or the vinyl pyrrolidone-vinyl ester copolymer is capable of forming a thin strong film, and a sufficient anti-agglomerating action can be obtained when the polyvinyl pyrrolidone or the vinyl pyrrolidone-vinyl ester copolymer is contained in an amount of at least 0.001 part by weight relative to 100 parts by weight of TEDA. The larger the amount, the higher the anti-agglomerating effects. However, the purity of the powder decreases as the amount of the additive to the powder increases. Therefore, the amount of addition should preferably be as small as possible. According to the present invention, the amount of addition is preferably from 0.001 to 2 parts by weight, more preferably from 0.01 to 0.1 part by weight, per 100 parts by weight of the powder. This amount corresponds to from 1/10 to 1/100 of the amount of the conventional additives.

A conventional anti-agglomeration agent such as polyethylene glycol, hydroxypropyl cellulose, a TEDA polymer or silica gel, may be used in combination.

Further, the polyvinyl pyrrolidone and the vinyl pyrrolidone-vinyl ester copolymer are colorless and transparent and chemically very stable. Therefore, they do not adversely affect the physical properties of the powder, and they show excellent solubility to various solvents and thus have excellent properties as additives or coating agents.

As described in the foregoing, the present invention provides an epoch-making agglomeration-preventing technique in which a very small amount of a water-soluble polyvinyl pyrrolidone and/or a vinyl pyrrolidone-vinyl ester coplymer is added to powder to coat it on the powder surface to impart excellent agglomeration-preventing effects by suppressing moisture absorption and sublimation of the powder and preventing the contact of the powder particles to one another.

Now, the present invention will be described in further detail with reference to Examples. However, it should be understood that the present invention is by no means restricted by such specific Examples.

EXAMPLE 1

For the test to study the agglomerating nature, TEDA powder having a purity of at least 99.95% was used, and as an anti-agglomeration agent, polyvinyl pyrrolidone (Rubiscol K30, tradename, manufactured by BASF Japan), was used. The addition was conducted in the following manner to form a coating of polyvinyl pyrrolidone on the surface of TEDA.

500 g of a TEDA cake was prepared on a Buechner funnel, and 200 ml of a 0.5% alcohol solution of the above anti-agglomeration agent was added thereto. The mixture was thoroughly mixed to contact the solution with TEDA crystals, followed by filtration to collect the TEDA crystals. The crystals were thoroughly dried under vacuum to obtain 430 g of a sample. The coated amount was 0.05 g the concentration of the additive in the crystals (same applies hereinafter): 116 ppm.

The measurement of the agglomeration degree and the evaluation standards were as follows. Namely, the obtained sample was packed in a container having a size of 5 cm×5 cm and a height of 2 cm, and a plastic plate of 5 cm×5 cm was placed thereon. A weight of 300 g was placed thereon, and the container was stored in a desiccater having a humidity of not higher than 1%. During the storage, the pressure exerted to the crystals was 12 g/cm$^2$. After the storage in the desiccater for one month, the weight and the container were removed, and a pressure was exerted to the center portion of the crystal block having the plastic plate located beneath, by a Kiya-type hardness meter, whereby the pressure at breakage was read. The values thus obtained were classified into the following three rankings, which were used as indices for evaluation of the agglomeration degree. In the-following Examples and Comparative Examples, the agglomeration degree was evaluated in the same manner. The results are shown in Table 1.

As is evident from Table 1, TEDA treated in this Example belongs to A rank, thus indicating excellent anti-agglomerating effects.

A rank: Crystal block which can readily be broken with a slight impact with a breaking pressure of not higher than 1.0 kg/cm$^2$ and in which no substantial progress of agglomeration was observed.

B rank: Crystal block with a breaking pressure of not higher than 10.0 kg/cm$^2$ which can not be broken by a low level of impact and in which agglomeration was found progressed entirely.

C rank: Crystal block which requires a considerably strong impact for breakage with a breaking pressure of at least 10.0 kg/cm$^2$ and in which agglomeration was found completely progressed.

COMPARATIVE EXAMPLE 1

The operation was conducted in the same manner as in Example 1 except that no anti-agglomeration agent was used.

The results are shown in Table 1.

COMPARATIVE EXAMPLE 2

3,000 ml of a TEDA methanol solution having a composition comprising 50 parts by weight of TEDA and 50 parts by weight of methanol, was introduced into a flask having an internal capacity of 5,000 ml, and 0.15 g of TEDA polymer (ethylene-piperazine copolymer prepared by the synthesis disclosed in Japanese Unexamined Patent Publication No. 62241/1988), was added thereto. The mixture was subjected to methanol removal by an evaporator, whereby 1,100 ml of methanol was distilled. The residual liquid was left to stand still at a room temperature and then cooled to a liquid temperature of 20° C. Precipitated TEDA crystals were collected by filtration under suction with a filter paper of No. 5C and then dried under vacuum to obtain 450 g of TEDA crystals. The TEDA polymer contained in the TEDA crystals was 0.05 g (111 ppm). With respect to this sample, the agglomeration degree was evaluated in the same manner as in Example 1.

The results are shown in Table 1. As is evident from Table 1, excellent agglomeration-preventing effects were exhibited, but when made into a 33 wt % dipropylene glycol solution, a certain level of turbidity was observed.

COMPARATIVE EXAMPLE 3

500 g of TEDA and 2 g of silica gel (manufactured by Nippon Silica Gel Kogyo K.K., bulk density: 40 g/l, average particle size: 2 μm) were thoroughly mixed by a V-mixer, and the obtained mixture was used as a sample. Otherwise, the operation was conducted in the same manner as in Example 1. The results are as shown in Table 1, and a certain degree of agglomeration was observed.

COMPARATIVE EXAMPLE 4

500 g of TEDA and 5 g (1%) of polyethylene glycol #200 (manufactured by Kanto Kagaku) were thoroughly mixed by a V-type mixer, and the mixture was used a sample. Otherwise, the operation was conducted in the same manner as in Example 1. The results are shown in Table 1.

EXAMPLE 2

The operation was conducted in the same manner as in Example 1 except that as the anti-agglomeration agent, a vinyl pyrrolidone-vinyl acetate copolymer (Rubiscol VA55E, manufactured by BASF Japan) was used instead of polyvinyl pyrrolidone, to obtain 420 g of TEDA crystals. The coated amount was 0.05 g (119 ppm). The results are shown in Table 1.

EXAMPLE 3

Using the same polyvinyl pyrrolidone as used in Example 1, the coated amount and the agglomeration-preventing effects were compared. The operation was conducted in the same manner as in Example 1 except that (1) 2%, (2) 1%, (3) 0.5%), (4) 0.1% or (5) 0.05% alcohol solution of polyvinyl pyrrolidone, or (6) pure alcohol, was used.

The amount of TEDA, the coated amount of polyvinyl pyrrolidone and the agglomeration-preventing action are shown in Table 2. As is evident from Table 2, a certain degree of agglomeration-preventing action was observed even at a coated amount of 10 ppm, and excellent agglomeration-preventing action was observed at a concentration of 100 ppm or higher. Further, no formation of turbidity or floating substance was observed in solutions of various solvents, such as alcohols, water and glycols.

EXAMPLE 4

Into a flask having an internal capacity of 2,000 ml, 1,000 g of an aqueous ammonium chloride solution comprising 35 parts by weight of ammonium chloride and 65 parts by weight of water, was introduced, and 0.5 g of the same polyvinyl pyrrolidone as used in Example 1, was added thereto. The mixture was heated by a mantle heater, and heating was stopped when 300 ml of water was distilled off. The flask was immersed in a water bath and cooled until the liquid temperature became 20° C. Precipitated ammonium chloride was collected by filtration under suction with a filter paper of No. 5C and washed with a small amount of pure water. The product was dried under vacuum to obtain 95 g of ammonium chloride. Here, polyvinyl pyrrolidone contained in the crystals was 0.025 g (263 ppm). The agglomeration degree of this sample was evaluated in the same manner as in Example 1. As a result, the agglomeration degree was found to be A rank.

COMPARATIVE EXAMPLE 5

The operation was conducted in the same manner as in Example 4 except that no polyvinyl pyrrolidone was used. In the ammonium chloride thereby obtained, the agglomeration was found progressed to the interior, and the agglomeration degree was found to be C rank.

EXAMPLE 5

Into a flask having an internal capacity of 2,000 ml, 1,000 g of an aqueous ammonium sulfate solution comprising 40 parts by weight of ammonium sulfate and 60 parts by weight of water, was introduced, and 0.5 g of the same polyvinyl pyrrolidone as used in Example 1, was added thereto. The mixture was heated by a mantle heater, and heating was stopped when 400 ml of water was distilled off. The flask was immersed in a water bath and cooled until the liquid temperature became 20° C. Precipitated ammonium sulfate was collected by filtration under suction with a filter paper of No. 5C and washed with a small amount of pure water. The product was dried under vacuum to obtain 240 g of ammonium sulfate. Here, polyvinyl pyrrolidone contained in the ammonium sulfate was 0.07 g (292 ppm). The agglomeration degree of this sample was evaluated in the same manner as in Example 1. As a result, the agglomeration degree was found to be A rank.

COMPARATIVE EXAMPLE 6

The operation was conducted in the same manner as in Example 4 except that no polyvinyl pyrrolidone was used. In the ammonium sulfate thereby obtained, agglomeration was found progressed to the interior, and the agglomeration degree was found to be C rank.

EXAMPLE 6

The operation was conducted in the same manner as in Example 1 except that as an anti-agglomeration agent, a mixture comprising polyvinyl pyrrolidone (Rubiscol K30, manufactured by BASF Japan) and a vinyl pyrrolidone-vinyl acetate copolymer (Rubiscol VA55E, manufactured by BASF Japan) (polyvinyl pyrrolidone:vinyl pyrrolidone-vinyl acetate copolymer = 1:1) was used instead of polyvinyl pyrrolidone, to obtain 460 g of TEDA crystals. The coated amount was 0.06 g (130 ppm). The agglomeration degree was found to be A rank.

TABLE 1

| | Additive | Amount of TEDA (g) | Treating method | Amount added (g) | Concentration of the additive (ppm) | Agglomeration preventing action | Others |
| --- | --- | --- | --- | --- | --- | --- | --- |
| Example 1 | Polyvinyl pyrrolidone | 430 | Coating | 0.05 | 116 | A | |
| Example 2 | Vinyl pyrrolidone-vinyl acetate copolymer | 420 | Coating | 0.05 | 119 | A | |
| Comparative Example 1 | Nil | 430 | — | 0 | 0 | C | Coagulation advanced very much |
| Comparative Example 2 | TEDA polymer | 450 | Precipitation | 0.05 | 111 | A | Slight turbidity observed when dissolved |
| Comparative Example 3 | Silica powder | 500 | Mixing | 2 | 4,000 | B | |
| Comparative Example 4 | Polyethylene glycol | 500 | Mixing | 5 | 10,000 | B | Crystals being wet |

TABLE 2

| No. | Concentration of the additive in the solution (%) | Amount of TEDA (g) | Coated amount (g) | Concentration of the additive in the powder (ppm) | Agglomeration-preventing action |
| --- | --- | --- | --- | --- | --- |
| (1) | 2 | 440 | 250 | 568 | A |
| (2) | 1 | 440 | 120 | 274 | A |
| (3) | 0.5 | 430 | 50 | 116 | A |
| (4) | 0.1 | 420 | 10 | 23 | B |
| (5) | 0.05 | 410 | 5 | 12 | B |
| (6) | 0 | 430 | 0 | 0 | C |

We claim:

1. A method for preventing the agglomeration of hygroscopic and sublimable powders of piperazine or triethylenediamine, characterized in that a polyvinyl pyrrolidone and/or a vinyl pyrrolidone-vinyl ester copolymer is incorporated as an anti-agglomeration agent to the powder.

2. The method according to claim 1, wherein the polyvinyl pyrrolidone is a compound having repeating units of the formula:

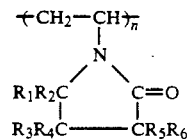   (1)

wherein n is an integer of at least 1, and each of $R_1$ to $R_6$ is H or a $C_{1-4}$ alkyl group.

3. The method according to claim 1, wherein the vinyl pyrrolidone-vinyl ester copolymer has repeating units of the formula:

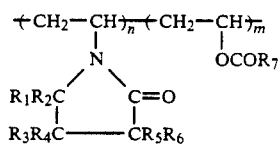   (2)

wherein each of n and m is an integer of at least 1, each of $R_1$ to $R_6$ is H or a $C_{1-4}$ alkyl group, and $R_7$ is a $C_{1-2}$ alkyl group.

4. The method according to claim 1, wherein each of the polyvinyl pyrrolidone and the vinyl pyrrolidone-vinyl ester copolymer has an average molecular weight of from 1,000 to 10,000.

5. The method according to claim 1, wherein the vinyl pyrrolidone-vinyl ester copolymer is a vinyl pyrrolidone-vinyl acetate copolymer with a polymerization ratio of the vinyl pyrrolidone to the vinyl acetate of from 5/5 to 3/7.

6. The method according to claim 1, wherein the polyvinyl pyrrolidone and/or the vinyl pyrrolidone-vinyl ester copolymer is incorporated in an amount of from 0.001 to 2 parts by weight per 100 parts by weight of the powder.

7. The method according to claim 1, wherein the polyvinyl pyrrolidone and/or the vinyl pyrrolidone-vinyl ester copolymer is incorporated in an amount of from 0.01 to 0.1 part by weight per 100 parts by weight of the powder.

* * * * *